United States Patent [19]
Core

[11] Patent Number: 5,828,115
[45] Date of Patent: *Oct. 27, 1998

[54] MICROMACHINED DEVICE WITH GROUND PLANE UNDER SENSOR

[75] Inventor: Theresa A. Core, North Andover, Mass.

[73] Assignee: Analog Devices, Inc., Norwood, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 755,295

[22] Filed: Nov. 22, 1996

Related U.S. Application Data

[63] Continuation of Ser. No. 486,894, Jun. 7, 1995, Pat. No. 5,578,224.

[51] Int. Cl.[6] .................................................. H01L 29/82
[52] U.S. Cl. ..................... 257/415; 257/417; 257/418; 257/419; 257/420; 438/50; 438/52
[58] Field of Search .................................. 257/108, 415, 257/418, 419, 420; 438/50, 52

[56] References Cited

U.S. PATENT DOCUMENTS

| | | | |
|---|---|---|---|
| 4,312,117 | 1/1982 | Robillard et al. | 437/182 |
| 4,802,952 | 2/1989 | Kobori et al. | 156/634.1 |
| 4,808,549 | 2/1989 | Mikkor et al. | 437/60 |
| 4,908,693 | 3/1990 | Nishiguchi | 257/417 |
| 5,164,339 | 11/1992 | Gimpelson | 437/235 |
| 5,314,572 | 5/1994 | Core et al. | 216/17 |
| 5,343,064 | 8/1994 | Spangler et al. | 257/350 |
| 5,578,224 | 11/1996 | Core | 216/2 |
| 5,619,050 | 4/1997 | Uenoyama et al. | 257/254 |

OTHER PUBLICATIONS

Yun, et al., "Surface Micromachined, Digitally Force–Balanced Accelerometer With Integrated CMOS Detection Circuity," IEEE Solid–State (con't) Sensor and Actuator Workshop, Hilton Head Island, SC, Jun. 22–25, 1992.

Brennan, et al., "Large Displacement Linear Actuator," IEEE Solid–State Sensor and Actuator Workshop, Hilton Head Island, SC, Jun. 4–7, 1990.

*Primary Examiner*—Jerome Jackson
*Assistant Examiner*—Allan R. Wilson
*Attorney, Agent, or Firm*—Hale and Dorr LLP

[57] ABSTRACT

A polysilicon ground plane is formed over dielectric layers and under a suspended, movable mass in a surface micromachined device. The process includes steps of forming a diffused region in a substrate, forming the dielectric layers over the substrate, forming the ground plane over dielectric layers, and forming a body having a suspended mass, a first anchor extending from the mass down to the diffused region, and a second anchor extending from the down to the ground plane. The two anchors are formed simultaneously. The ground plane, which can be formed with only three additional steps over prior processes, serves as a ground plane to control changes and also as a local interconnect.

16 Claims, 2 Drawing Sheets

MICROMACHINED DEVICE WITH GROUND PLANE UNDER SENSOR

This is a continuation of application Ser. No. 08/486,894 filed on Jun. 7, 1995, now U.S. Pat. No. 5,578,224.

FIELD OF THE INVENTION

This invention relates to micromachined devices and to a method for making micromachined devices.

BACKGROUND OF THE INVENTION

A process for making a micromachined accelerometer having a sensor area and a separate circuit area on one die is shown and described in U.S. Pat. No. 5,326,726, which is expressly incorporated herein by reference. As shown in FIG. 23 of the incorporated patent, the sensor area has a movable mass that is suspended with anchors over a surface of the die. The sensor area also has fixed beams suspended over the surface of the die so that capacitances between the movable mass and the fixed beams can be sensed. Dielectric layers are formed over the surface of the die and under the suspended mass. Charges that accumulate on these dielectric layers can be difficult to control. The dielectric layers are also useful and desirable, however, because they prevent leakage currents.

SUMMARY OF THE INVENTION

According to the present invention, a conductive layer is formed over a dielectric layer and under a suspended sensor mass in an integrated micromachined device. The conductive layer is electrically coupled to the mass and can serve both as a ground plane and as an interconnect for electrically coupling different parts of the sensor region. The conductive layer, which is preferably made of polysilicon, can be coupled to a circuit area or to a bond pad contact through a diffused region such that the polysilicon layer need not traverse a transition region between the sensor area and the circuit area.

One embodiment of a process according to the present invention includes the steps of forming a diffused region in a substrate; forming one or more dielectric passivation layer over the substrate; forming a conductive layer over the dielectric layer; forming a sensor having a suspended mass, a first anchor coupled to the diffused region, and a second anchor coupled to the conductive layer; and forming an exposed metal contact coupled to the diffused region. These steps are preferably performed in the order recited. The conductive layer is preferably formed by depositing a 3500 angstrom thick polysilicon layer and doping the layer until it has a surface resistance of about 60–80 ohms/square. The dielectric layer can be formed as a number of separate passivation layers, including one or more nitride and oxide layers.

Because the voltage of the conductive layer is controllable, it prevents charges from building up. The layer also can serve as a local interconnect between portions of the sensor and, through a diffused region, from these portions to circuitry in a circuit area or to a bond pad contact. With this diffused region, the conductive layer need not traverse a transition region between the circuit area and the sensor area. As a local interconnect the ground plane can couple different portions of the sensor, certain fixed beams.

Accordingly, the ground plane can perform several functions, is easy to fabricate, and requires few additional process steps compared to known processes. Other features and advantages will become apparent from the following detailed description, claims, and drawings.

DETAILED DESCRIPTION

According to the present invention, a conductive layer serves as a ground plane and can serve as an interconnect for a micromachined device. The conductive layer can be formed as part of an integrated micromachined process, such as the process disclosed in the incorporated U.S. Pat. No. 5,326,726, with a small number of altered steps and a small number of newly added steps. Specific aspects of the process described in the incorporated patent are not necessarily required; rather, this particular process is described here as an exemplary process for forming a micromachined device.

Figure 1:
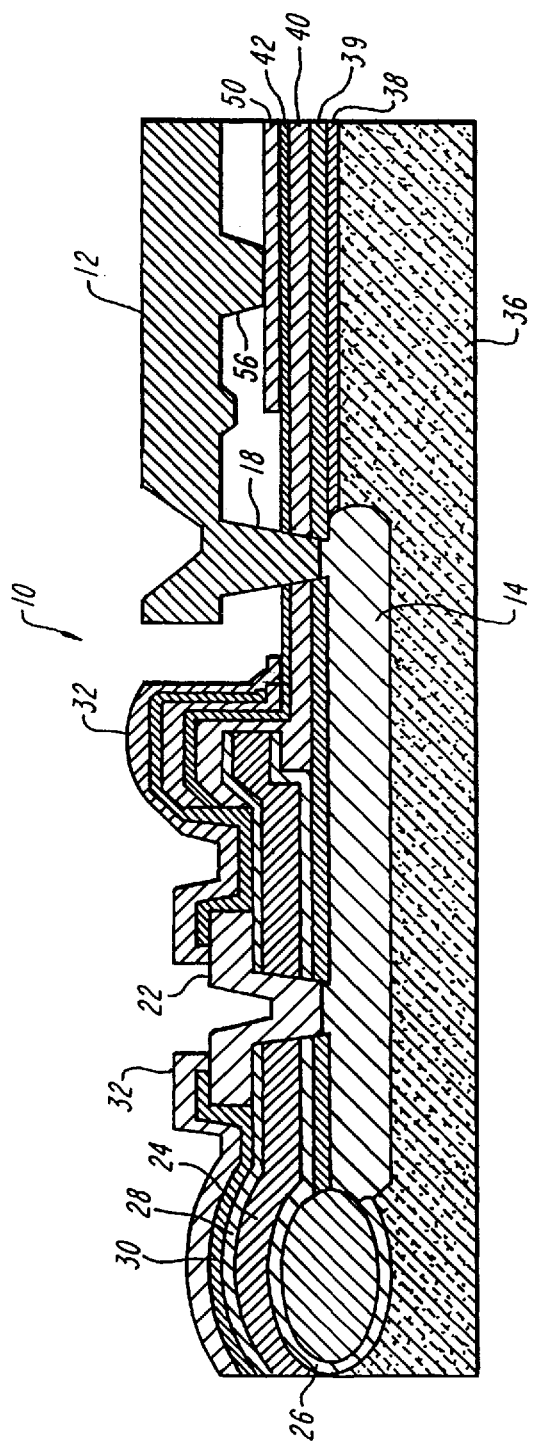
FIGS. 1 and 2 are cross-sectional views of a microstructure according to present invention.

Referring to FIG. 1, an integrated micromachined device 10 is formed in a substrate 36, preferably with a process that is generally similar to that described in the incorporated patent. The process disclosed in that patent includes steps of forming a diffused region 14 in substrate 36, forming a plate 38 in the substrate adjacent the diffused region, forming dielectric layers 39, 40, and 42 over the plate and the diffused region (and hence over the substrate), forming a sensor having a suspended mass 12 and a first anchor 18 extending from mass 12 to diffused region 14, and forming an exposed metal contact 22 coupled to diffused region 14. The sensor is preferably formed by forming a sacrificial oxide (not shown) over the dielectric layers, forming a first opening in the sacrificial oxide and in the dielectric layers for the anchor, depositing polysilicon, and then eventually removing the sacrificial oxide. While one anchor is shown and described here, mass 12 is typically suspended by a plurality of anchors.

According to the present invention, the process further includes a step of forming a conductive ground plane 50 over the dielectric layers after the dielectric layers are formed and before the sensor is formed. When the sensor is formed, a second anchor 56 for coupling mass 12 to ground plane 50 is formed near first anchor 18 and at the same time. Accordingly, to form the sensor, a second opening is formed near the first opening so that the two anchors are made simultaneously. By using such a second anchor, there is no need for a second dedicated anchor mask and an additional anchor implant. Preferably, the steps recited above are performed in the order recited.

Compared to the exemplary process of the incorporated patent, the process of forming ground plane 50 preferably requires only three additional process steps. These steps would follow a sensor nitride deposition step ("PROCESS 40") and precede a spacer LTO deposit step ("PROCESS 42") in the process of the incorporated patent. The three additional steps are: (1) deposit ground plane polysilicon, preferably to a depth of 3500 angstroms; (2) implant the ground plane polysilicon, preferably with phosphorus with a doping level in the range of $4$–$8\times10^{15}/cm^2$ so that the polysilicon has a sheet resistance of about 60–80 ohms/square; and (3) mask the ground plane polysilicon.

Because the parasitic capacitance between the polysilicon ground plane and the substrate is large, this capacitance should be taken into account in the design. In particular, the capacitance for the polysilicon, 1200 angstrom nitride layer, 700 angstrom oxide layer, and silicon substrate typically is about $2.88\times10^{-16}$ $F/micron^2$; over the diffused regions, where the oxide is about 1000 angstroms, the capacitance between the polysilicon ground plane and the substrate typically is about $2.36\times10^{-16}$ F/micron$^2$.

Figure 2:
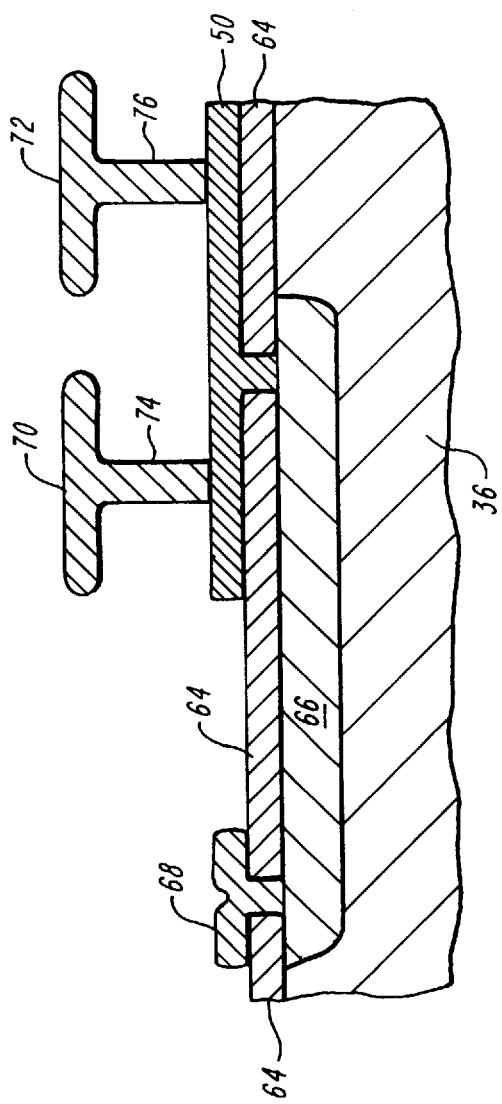

Referring to FIG. 2, conductive ground plane 50 extends through an opening in dielectric layer 64 and contacts a diffused runner 66. Runner 66 extends from ground plane 50 to a metal contact 68, which also extends through an opening in dielectric layer 64 (layer 64 is shown here in a representative form, but could include other materials around contact 68 as in FIG. 1). Alternatively, diffused region 66 could extend to other circuitry in a circuit area on the die. Diffused runner 66, like diffused region 14, is preferably an N+ region, and substrate 36 is preferably P-type.

The sensor can be made up of multiple portions, including beams 70, 72, shown here in general form. Beams 70, 72 could be beams that are fixed relative to substrate 36. Anchors 74, 76 couple fixed beams 70, 72 to the surface to suspend these beams over ground plane 50. The ground plane also electrically connects beams 70, 72, thus avoiding the need for additional diffused runners between anchors 74, 76.

Layers 26, 24, 28, 30, and 32 are formed over a thick oxide region that separates sensor area from a circuit area. These layers, and the processes for forming these layers, are described in the incorporated U.S. Pat. No. 5,326,726. As described in the incorporated patent, these layers include a BPSG layer 24, nitride layers 26, 28, and 32, and a plasma oxide layer 30.

Having described a preferred embodiment of the present invention, it should be apparent that other modifications can be made without departing from the scope of the appended claims. For example, certain details, such as thicknesses, doping levels, and conductivity can be altered as desired. Also, the process of the present invention need not be used only with the specific steps in the incorporated patent; rather the various forming steps could be altered or improved. For example, there need not necessarily be two oxide layers and a nitride layer as the dielectric layers; rather, it is only necessary to have at least one dielectric layer.

What is claimed is:

1. A micromachined device comprising:
   a substrate;
   a first diffused region formed in the substrate;
   a dielectric layer formed over the substrate;
   a conductive layer formed on the dielectric layer; and
   a body including a mass suspended over the substrate and lying in a plane parallel to a surface of the substrate, a first anchor extending to the diffused region, and a second anchor extending to the conductive layer, each of the first and second anchors extending generally perpendicular to the plane.

2. The device of claim 1, wherein the dielectric layer includes a layer of nitride and a layer of oxide.

3. A micromachined device comprising:
   a substrate;
   a first diffused region formed in the substrate;
   a dielectric layer formed over the substrate;
   a conductive layer formed on the dielectric layer; and
   a body including a mass suspended over the substrate, a first anchor extending to the diffused region, and a second anchor extending to the conductive layer, wherein the conductive layer includes a polysilicon layer formed on the dielectric layer, and not over the diffused region.

4. The device of claim 1, further comprising a second diffused region coupled to the conductive ground plane.

5. The device of claim 4, further including a metal contact, wherein the second diffused region extends from the conductive layer to the metal contact.

6. The device of claim 1, further comprising an exposed metal contact extending to the first diffused region, the diffused region coupling the mass and the metal contact.

7. The device of claim 4, where the device is an integrated micromachined device with a sensor area including the movable mass and a circuit area, the second diffused region extending from the ground plane to the circuit area of the device.

8. In a micromachined device formed in a substrate and having a diffused region formed in the substrate, a movable mass having a main body portion suspended over the substrate, a first anchor extending from the main body portion of the mass to the diffused region, and a dielectric layer formed over the substrate, the improvement comprising:
   a conductive ground plane formed on the dielectric layer and under the main body portion; and
   a second anchor extending from the main body portion of the mass to the conductive ground plane.

9. The improvement of claim 8, wherein the micromachined device is an integrated device with a sensor area including the movable mass and a circuit area, the improvement further comprising a second diffused region extending from the conductive ground plane and the circuit area.

10. The improvement of claim 8, wherein the device includes first and second members spaced apart and suspended over the substrate, the conductive ground plane being coupled to the first and second members for electrically interconnecting the first and second members.

11. A micromachined device comprising:
    a substrate;
    a mass suspended over the substrate;
    a first diffused region in the substrate and at least partially under the mass;
    a dielectric layer over the substrate and at least partially under the mass;
    a conductive layer on the dielectric layer and at least partially under the mass;
    a first anchor extending from the mass to the diffused region; and
    a second anchor extending from the mass to the conductive layer, wherein the first and second anchors extend substantially perpendicular to the plane in which the mass lies.

12. The device of claim 11, wherein the conductive layer is a ground plane.

13. The device of claim 11, wherein the conductive layer is a polysilicon layer formed on the dielectric layer and not over the diffused region.

14. The device of claim 11, wherein the mass lies in a plane substantially parallel to a surface of the substrate.

15. A micromachined device comprising:
    a substrate;
    a mass suspended over the substrate;

a metal contact over the substrate and spaced from the mass;

a first diffused region in the substrate and extending under and in contact with the metal contact;

a dielectric layer over the substrate and at least partially under the mass;

a conductive layer on the dielectric layer and at least partially under the mass;

a first anchor extending from the mass to the diffused region; and a second anchor extending from the mass to the conductive layer.

16. The device of claim 15, further comprising a second metal contact and a second diffused region coupled to the second metal contact, wherein the dielectric layer has an opening, the conductive layer being coupled to the second diffused region through the opening.

* * * * *